United States Patent Office 3,351,596
Patented Nov. 7, 1967

3,351,596
3-FORMYL CEPHALOSPORINS
James W. Chamberlin, Indianapolis, Ind., assignor to Eli Lilly and Company, Indianapolis, Ind., a corporation of Indiana
No Drawing. Filed Sept. 21, 1966, Ser. No. 580,897
9 Claims. (Cl. 260—243)

This invention relates to novel organic compounds and to methods for preparing them. More particularly, this invention provides some new and useful cephalosporin-type compounds which are active antibiotics against both Gram-positive and Gram-negative microorganisms and which are useful intermediate compounds in the preparation of other new cephalosporin-type compounds.

Cephalosporin C, a valuable antibiotic having the formula:

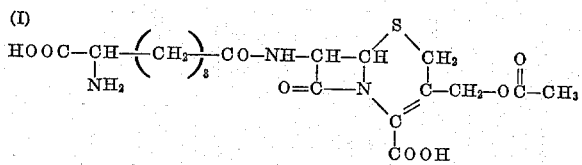

is produced simultaneously with Cephalosporin N, a penicillin-type compound also known as Synnematin B and (D-4-amino-4-carboxy-n-butyl)penicillin, by fermentation processes using a species of Cephalosporin, as described in British patent specification 810,196, published March 11, 1959. Since the preparation of Cephalosporin C, other 7-acylamido-cephalosporanic acid compounds have been prepared by synthetic chemical methods by reacting the selected organic acid or acid halide with 7-aminocephalosporanic acid. By such methods, cephalosporin compounds with numerous types of acyl radicals in the 7-position have been prepared. Such prior art is exemplified by U.S. Patents 3,173,916, 3,218,318, and 3,252,973.

However, no one prior to this invention has ever provided cephalosporins with reactive formyl groups in the 3-position of the cephalosporin molecule. Having a formyl group in the 3-position of the cephalosporin molecule not only provides useful antibiotics but also provides reactive intermediates and a new route to other active antimicrobial substances.

It is an object of this invention to provide new cephalosporin compounds.

It is a further object of this invention to provide reactive intermediate cephalosporin-type compounds.

It is yet another object of this invention to provide a method for preparing antibiotic, chemically reactive, 3-formylcephalosporin compounds.

Other objects, aspects, and advantages of this invention become apparent from reading the following description and the claims.

Briefly, this invention provides new 3-formyl analogs of 7-acylcephalosporanic acid esters which may be illustrated by the following general formula:

(II)

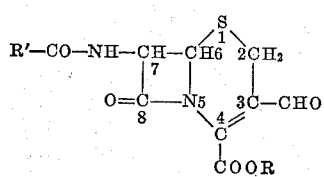

where R is an ester group, preferably $C_1$ to $C_6$ alkyl such as methyl, ethyl, tert-butyl, etc., phenyl, an easily removed ester group such as diphenylmethyl, benzyl, 3,5-dimethoxybenzyl, p-methoxybenzyl, $C_1$-$C_6$ haloalkyl group such as 2,2,2-trichloroethyl, or a heterocyclic ester group such as tetrahydropyranyl, and R′ is the residue of the acyl radical formed with the —CO— carbonyl moiety.

These compounds can be prepared for example, by reacting a 7-acylamidodesacetylcephalosporin with a diazo compound to form the 7-acylamidodesacetylcephalosporin ester, and treating the resulting desacetylcephalosporin ester with an oxidizing agent to form the 3-formylcephalosporin ester.

In naming the novel compounds of this invention, it is convenient to designate the basic saturated fused ring beta-lactam thiazine structure as "cepham,"

(III)

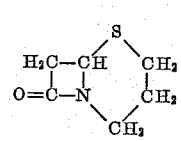

and to name the compounds as derivatives thereof, the term "cephem" referring to the basic structure with a single olefinic bond. A compound of this invention named by such nomenclature system is ethyl 7-(phenoxyacetamido)-3-formyl-3-cephem-4-carboxylate (the 3 before the cephem referring to the position of the double bond in the thiazine ring moiety by the lowest number carbon atom to which it is attached). More informally, it is convenient to consider the compounds of this invention as 3-formylcephalosporin ester derivatives.

The following compounds are illustrative examples of the compounds lying within the scope of the present invention:

Methyl 7-(2-thienylacetamido)-3-formyl-3-cephem-4-carboxylate,
Trichloroethyl 7-[α-(2-furoylamido)]-3-formyl-3-cephem-4-carboxylate,
Benzyl 7-(imidazolylacetamido)-3-formyl-3-cephem-4-carboxylate,
Diphenylmethy 7 - [β-(2′-furyl)propionamido]-3-formyl-3-cephem-4-carboxylate,
3,5-dimethoxybenzyl 7-(1-pyrazoleacetamido)-3-formyl-3-cephem-4-carboxylate.

The starting materials are 7-acylamidodesacetylcephalosporin compounds, that is, 7-acylamido-3-hydroxymethyl-3-cephem-4-carboxylate compounds in which R′ in the above formula represents any organic radical found in the corresponding portion in pencillin and cephalosporin molecules including aliphatic, cycloaliphatic, and aromatic carbocyclic and heterocyclic radicals. For example, R′ may be a straight chained, or branched chain, saturated or unsaturated aliphatic radical, exemplified by buten-1-yl, buten-2-yl, n-butyl, n-hexyl ($Δ^8$-nonenyl), allyl, and tert-butyl radicals. Additional aliphatic radicals which R′ may represent are those which contain as a member of the chain an interrupting atom such as oxygen, sulfur, nitrogen and the like, for example, as an allyloxymethyl and ethylmercaptomethyl radicals. The carbocyclic radicals which R′ may represent include fully saturated and partially or completely unsaturated radicals, illustrative examples of which are the 5,6,7,8-tetrahydro-2-naphthyl, cyclopentyl, cyclohexen - 3 - yl, benzylmercaptomethyl, phenoxymethyl, and alpha-, alpha-dimethylbenzyl radicals. The heterocyclic-including radicals which R′ may represent include the thienyl and furyl radicals bonded to the carbon atom of the amido group in the 7-position of the cephem nucleus by an aliphatic hydrocarbon group such as the alpha-2-thienylethyl radical.

Further specific examples of aliphatic, carbocyclic-including and heterocyclic-including radicals falling within the invention and the definition of the R' group are the vinyl,
ethoxy,
cyclopentenyl,
cyclohexyl,
2,4-dichlorobenzyl,
3,4-dichlorobenzyl,
m-bromobenzyl,
o-bromobenzyl,
p-bromobenzyl,
m-chlorophenyl,
o-chlorophenyl,
p-chlorophenyl,
m-fluorophenyl,
o-fluorophenyl,
p-fluorophenyl,
p-iodophenyl,
p-nitrophenyl,
p-chlorophenyl,
m-nitrophenyl,
o-nitrophenyl,
3-chloro-4-bromophenyl,
m-trifluoromethylbenzyl,
m-trifluoromethylphenoxymethyl,
4-methylbenzyl,
2-methylphenyl,
m-methylbenzyl,
phenylmercaptomethyl,
p-methylmercaptophenylethyl,
o-methoxyphenylethyl,
m-methoxyphenylethyl,
o-methylphenoxypropyl,
p-methoxyphenoxymethyl,
p-cyanophenylethyl,
3,4-dimethylphenylethyl,
beta-phenylbutyl,
p-carbethoxyhydroxyphenylethyl,
beta-naphthylmethyl,
beta-naphthoxymethyl,
1-bromo-2-naphthylmethyl,
6-bromo-2-naphthylethyl,
2-chloro-3-naphthylmethyl,
6-fluoro-2-naphthylmethyl,
1-nitro-2-naphthylethyl,
beta-naphthylmercaptomethyl,
6-methoxy-2-naphthylmethyl,
p-phenoxyphenylmethyl,
m-phenoxybenzyl,
p-diphenylylmethyl,
p-isopropylbenzyl, and
p-benzyloxyphenylethyl radicals.

Specific examples of such 7-acylamidodesacetyl cephalosporin starting materials which may be used include:
7-benzyloxyacetylamindodesacetylcephalosporin
7-benzyloxyphenoxyacetylamidodesacetylcephalosporin
7-(2-furylacetylamido)desacetylcephalosporin
7-(o-nitrophenoxyacetylamido)desacetylcephalosporin
7-(2,2-dimethylacetylamido)desacetylcephalosporin
7-(valerylamido)desacetylcephalosporin
7-benzylamidodesacetylcephalosporin
7-[alpha-(p-tert-butyl)phenoxypropionylamido]desacetylcephalosporin
7-(phenylmercaptoacetylamido)desacetylcephalosporin
7-(o-tolylmercaptoacetylamido)desacetylcephalosporin
7-(m-tolylmercaptoacetylamido)desacetylcephalosporin
7-(p-tolylmercaptoacetylamido)desacetylcephalosporin
7-(m-chlorophenylmercaptoacetylamido)desacetylcephalosporin
7-(o-bromophenylmercaptoacetylamido)desacetylcephalosporin
7-(o-methoxyphenylmercaptoacetylamido)desacetylcephalosporin
7-(m-trifluoromethylphenylmercaptoacetylamido)desacetylcephalosporin
7-(benzylmercaptoacetylamido)desacetylcephalosporin
7-(phenylethylmercaptoacetylamido)desacetylcephalosporin
7-(n-butylmercaptoacetylamido)desacetylcephalosporin
7-(beta-phenoxypropionylamido)desacetylcephalosporin
7-(alpha-phenoxy-n-butanoylamido)desacetylcephalosporin
7-[alpha-(p-nitrophenoxy)n-butanoylamido]desacetylcephalosporin
7-(alpha-phenoxyisobutanoylamido)desacetylcephalosporin
7-(alpha-phenoxyisoamoylamido)desacetylcephalosporin
7-(2-furylacetylamido)desacetylcephalosporin
7-[beta-(2'-furylpropionylamido)desacetylcephalosporin
7-(2-thienylacetylamido)desacetylcephalosporin
7-(3-thienylacetylamido)desacetylcephalosporin
7-[gamma(2-thienyl)-n-butnoylamido]desacetylcephalosporin
7-(2-benzofurylacetylamido)desacetylcephalosporin
7-(1-pyrazoleacetylamido)desacetylcephalosporin
7-[2-(1,2,4-triazole-1)acetylamido]desacetylcephalosporin
7-(N-methyl-2-pyrrylacetylamido)desacetylcephalosporin
7-(N-pyrrylacetylamido)desacetylcephalosporin
7-(3-indoleacetylamido)desacetylcephalosporin
7-(3-benzophenylacetylamido)desacetylcephalosporin
7-(alpha-phenylpropionylamido)desacetylcephalosporin
7-(beta-phenylpropionylamido)desacetylcephalosporin
7-(alpha-phenyl-n-butanoylamido)desacetylcephalosporin
7-[gamma(ortho-chlorophenyl)-n-butanoylamido]desacetylcephalosporin
7-(4-phenyl-2-butanoylamido)desacetylcephalosporin
7-(cyclopentylacetylamido)desacetylcephalosporin
7-(adamantyacetylamido)desacetylcephalosporin
7-(alpha-naphthylacetylamido)desacetylcephalosporin and
7-(beta-naphthyloxyacetylamido)desacetylcephalosporin.

The compounds of the invention can be prepared by commingling the selected 7-acylamidodesacetylcephalosporin, exemplified above, in an organic solvent with a diazo compound of the type:

wherein each of R'' and R''' denotes hydrogen, an alkyl or haloalkyl radical having up to about 6 carbon atoms, or a (carboalkyloxy(alkyl radical having up to 6 carbon atoms except that when R'' is a carboalkoxyalkyl radical R''' is hydrogen, and R'' and R''' taken together with the carbon atom to which they are attached denote an aryl hydrocarbon radical having from 6 to 8 carbons. It is preferred that each of R'' and R''' be hydrogen, an alkyl group of from 1 to 6 carbon atoms, a phenyl or benzyl radical. The diazo compound is preferably used in substantial molar excess relative to the 7-acylamidodesacetylcephalosporin to insure complete reaction of the 7-acylamidodesacetylcephalosporin. The reaction is suitably conducted at temperatures of from about 0° C. to about 100° C., preferably around 20° to 35° C., and in a pH range of about pH 2.0 to about pH 3.0. Under preferred conditions, this diazo compound reaction step to form the acylamidodesacetylcephalosporin ester is completed within about 1 hour. Lower temperatures than those stated may be used but require longer reaction times. Higher temperatures cause substantial chemical degradation.

Examples of diazo compounds which may be used are the diazoalkanes having a total of up to about 12 carbon atoms such as diazomethane, diazoethane, diazopropane, diazoisobutylene, diazopentane, diazooctane, diazodecane, diazododecane, diarylmethane compounds having up to about 8 carbon atoms in each aryl group, e.g. diphenyl diazomethane, bis(p-tolyl)diazomethane, bis(m-tolyl)diazomethane, and phenyl(xylylenyl)diazo methane, diazobenzene, diazotoluene, diazoxylene, halogenated hydrocarbon diazo compounds having up to about 12 carbon atoms such as bis-(trichloroethyl) diazomethane, 2,2,2-trichlorodiazoethane, and bis-(p-chlorophenyl)diazomethane, and diazo alkanoic acid esters such as ethyl diazoacetate, propyl diazopropionate, butyl diazoacetate and the like.

The reaction may be conducted in any water-immiscible organic solvent medium which does not react substantially with any of the reactants. Examples of suitable solvents include halogenated hydrocarbons such as methylene chloride, chloroform, carbon tetrachloride, esters such as ethyl acetate, propylene glycol diacetate, ethers such as diethyl ether, and the like.

The organic solvent solution of the 7-acylamidodesacetylcephalosporin ester intermediate [7-acylamido-3-hydroxymethyl - 3-cephem - 4-carboxylate ester] may be treated to separate the crude product therefrom in preparation for the treatment thereof with the oxidizing agent in the second step of the process but such is not necessary. The organic solvent and by-products may be volatilized off and the residue washed with organic solvents to remove soluble impurities to purify the intermediate, if desired.

The intermediate 7-acylamidodesacetylcephalosporin ester thus obtained is then treated in a suitable organic solvent with an oxidizing agent in an amount sufficient to convert the 3-hydroxymethyl group to a formyl group. A slight molar excess of the oxidizing agent is preferred to insure complete reaction of the desacetylcephalosporin compound. Examples of suitable oxidizing agents include oxidizing metal compounds such as, e.g., oxidizing metal oxides such as chromium trioxide and manganese dioxide. The mixture is preferably agitated to insure intimate contact of the reactants and to shorten the reaction time. The reaction generally is complete within about 48 hours. The crude 7-acylamido-3-formyl-3-cephem-4-carboxylate ester product may be recovered from the resulting reaction mixture by conventional methods, e.g., by filtering off any solid or spent oxidizing agent, removal of solvent by evaporation, and purification of the product by chromatography or recrystallization from an appropriate solvent, such as a lower alkanol or an ester such as ethyl acetate.

The desired 3-formyl-4-carboxylate ester can be separated from the reaction mixture in crude form by evaporation to dryness under vacuum. The residue, containing a major proportion of the desired 3-formyl-3-cephem-4-carboxylate ester, usually contains a minor proportion of a lactone formed from the 3-hydroxymethyl group and the carboxyl group. The lactone structure is not detrimental to further reactions of the desired 3-formyl-3-cephem-4-carboxylate ester product; and, therefore, need not be separated therefrom.

The compounds of this invention are characterized by resistance to the destructive action of penicillinase, minimal toxicity, and bacteriostatic activity against Gram-positive organisms such as *B. subtilis*, and have bacteriostatic activity approximately equal to that of penicillin G against some Gram-negative organisms such as *Escherichia coli*. For example methyl 7-(2-thienylacetamido)-3-formyl-3-cephem-4-carboxylate had a minimum inhibitory concentration (MIC) against *Bacillus subtilis* of less than 6.25 μg./ml. in a standard agar dilution test. Against *Escherichia coli*, a Gram-negative organism (Lilly strain N–10) the product had a MIC of 33 μg./ml. Against *Escherichia coli* (Lilly strain N–26) the MIC was 27 μg./ml. They are of particular interest for their use as intermediates to prepare other new compounds through the reactive 3-formyl group. The 7-acylamido-3-formyl-3-cephem-4-carboxylate esters are capable of many of the reactions associated with aldehyde groups. These antibiotic aldehyde esters can be reacted with alcohols, thiols, or glycols to obtain the corresponding acetal, thioacetal, or dioxanyl compounds. They react with hydrazine to form the corresponding hydrazone, and with semi-carbazide to form the semicarbazone. They form addition salts with sodium bisulfite. They form oximes with hydroxylamine. They also form imines by reaction with primary or secondary amines and amines by reduction of the resulting imines. They also form cyanohydrins by reaction with hydrogen cyanide.

The invention will be more readily understood from the following operating examples, which are submitted as being illustrative only, and not by way of limitation.

*Example 1*

A reaction product of about 1.5 liter volume obtained from the treatment of 20 g. of the sodium salt of 7-(2-thienyl-acetamido)cephalosporanic acid with orange peel acetyl esterase was chilled in ice and then 300 g. of powdered sodium chloride were added. The resulting mixture was divided in half. One portion was treated with about 300 ml. of ethyl acetate and the pH was adjusted to about 2.0 with hydrochloric acid. The mixture was then filtered through a "Celite" filter aid pad and the pad was washed several times with ethyl acetate. The aqueous layer of the filtrate was separated and extracted again with ethyl acetate. The ethyl acetate extracts were combined, mixed with water (one-half the volume of the extracts), and then the pH was adjusted to 6.5 with aqueous 1 N potassium hydroxide solution. The aqueous layer was separated and evaporated to dryness under reduced pressure. The residue was recrystallized from methanol-isopropanol mixture to effect purification. There was thus obtained in two crops 10.7 g. (57% yield) of the potassium salt of 7-(2-thienylacetamido)-3-hydroxymethyl-3-cephem-4-carboxylate.

To a solution of 1.5 g. of the potassium salt of 7-(2-thienylacetamido) - 3-hydroxymethyl - 3-cephem - 4-carboxylate, prepared as above, in 75 ml. of water were added 50 ml. of ethyl acetate. The mixture was cooled in ice, stirred vigorously, and acidified to pH 2.0 by the dropwise addition of aqueous 1 N hydrochloric acid. The ethyl acetate layer was separated and treated at once with an ethyl ether solution of diazomethane. After standing for several minutes, the solution was evaporated to dryness under reduced pressure. The crude product which remained amounted to 1.07 g. From the NMR spectrum of crude product, it was estimated that the residue contained about 65 to 75% of the desired methyl ester of 7-[2-thienylacetamido]-hydroxymethyl - 3-cephem-4-carboxylate. A contaminant was most likely the lactone of 7-(2-thienylacetamido) - 3-hydroxymethyl-3-cephem-4-carboxylic acid.

A mixture of 0.3 g. of the crude methyl ester of 7-(2-thienylacetamido) - 3-hydroxymethyl - 3-cephem - 4-carboxylate, 0.9 g. of manganese dioxide activated by the method of Sondheimer et al., J.C.S. (1953), page 2189, and 30 ml. of chloroform was stirred at room temperature for 20 hours. An additional 0.45 g. of manganese dioxide was added then and stirring was continued for 48 hours. The mixture was filtered and the filtrate evaporated to dryness. The residue was taken up in chloroform and chromatographed on 15 g. of silicic acid. Elution of the silicic acid column with ethyl acetate-chloroform (1:3) mixture yielded 0.05 g. of the methyl ester of 7-(2-thienylacetamido) - 3-formyl-3-cephem - 4-carboxylate, M.P.

165–170° C. (dec.). One recrystallization from isopropanol gave material melting at 167–170° C. (dec.) and analyzing as containing 49.15 percent carbon, 4.03 percent hydrogen, 7.18 percent nitrogen and 18.03 percent sulfur as compared with 49.16 percent carbon, 3.85 percent hydrogen, 7.65 percent nitrogen, and 17.50 percent sulfur, the calculated values.

The structure was confirmed by ultraviolet and nuclear magnetic resonance spectra.

The aldehyde product formed a red 2,4-dinitrophenylhydrazone which was recrystallized twice from ethyl acetate-ethanol to give M.P. 215–220° (dec.) to further confirm the structure.

Example 2

To an ice cold solution of 1.10 g. of the crude methyl ester of 7 - (2-thienylacetamido) - 3 - hydroxymethyl-3-cephem-4-carboxylic acid, prepared as described in Example 1, in 27 ml. of acetone there were added 1.68 ml. of Jones reagent (CrO₃ in 8 N sulfuric acid). A green percipitate formed immediately, followed shortly by a yellow precipitate. After 10 minutes the mixture was poured into water and extracted three times with chloroform. The combined chloroform extracts were washed twice with water and once with saturated sodium chloride solution, and dried with anhydrous sodium sulfate. Evaporation of the chloroform solvent gave 0.834 g. of the crude methyl ester of 7 - (2-thienylacetamido)-3-formyl - 3 - cephem-4-carboxylic acid. Recrystallization of 0.3 g. of this material from ethyl acetate-chloroform and then from chloroform furnished 0.108 g. of the pure 7-(2-thienylacetamido) - 3 - formyl - 3 - cephem-4-carboxylate product, M.P. 177–179° C. (dec.). The infrared and NMR spectra were identical with those of the product obtained by the manganese dioxide oxidation procedure of Example 1.

Example 3

This example illustrates the use of the products of this invention as intermediates.

A mixture of 0.090 g. of methyl 7 - (2-thienylacetamido) - 3 - formyl - 3 - cephem-4-carboxylate, 0.2 g. of ethylene carbonate, 0.5 ml. of ethylene glycol, 0.002 g. of p-toluenesulfonic acid monohydrate, and 2.5 ml. of tetrahydrofuran was allowed to stand at room temperature for 19.5 hours. The mixture was then poured into water, and extracted twice with ether-ethyl acetate. The combined extracts were washed once with saturated sodium chloride solution, and dried with anhydrous sodium sulfate. Evaporation of the solvent gave 0.071 g. of crude ethylene acetal product. This crude product was recrystallized from isoprapanol to give 0.036 g. of pure methyl 7 - (2-thienylacetamido) - 3 - (1,3,2-dioxolanyl)-cephem-4-carboxylate M.P. 200–205° C. (dec.).

Example 4

The procedure of Example 1 is repeated, except that an equivalent amount of potassium 7-[alpha(tert-butyloxycarbonyl)amido-D-phenylglycylamido] - 3 - hydroxymethyl - 3 - cephem - 4 - carboxylate is substituted for the potassium 7 - (2-thienylacetamido) - 3 - hydroxymethyl - 3 - cephem - 4 - carboxylate to obtain as product the methyl 7 - [alpha(tert-butyloxycarbonyl)amido-D - phenylglycylamido] - 3 - formyl - 3- cephem-4-carboxylate ester. The tert-butyloxycarbonyl amino protecting group is removed by treating the ester with formic acid to obtain as product, the antibiotically active methyl 7 - (alpha-amino-D-phenylglycylamido)-3-formyl-3-cephem-4-carboxylate ester.

I claim:
1. Compounds of the formula:

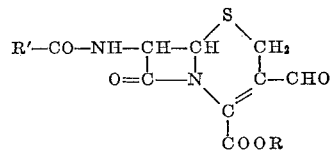

wherein R is an ester group selected from the group consisting of alkyl having from 1 to 6 carbon atoms, 2,2,2-trichloroethyl, benzyl, and phenyl, and R' is selected from the group consisting of thienylmethyl and α-amino-D-phenylmethyl.

2. Compounds of the formula described in claim 1 wherein R is an alkyl ester group having from 1 to 6 carbon atoms and R' is 2-thienylmethyl.

3. A compound according to claim 2 wherein the compound is methyl 7 - (2-thienylacetamido) - 3 - formyl-3-cephem-4-carboxylate.

4. A compound as described in claim 1 wherein R is alkyl having from 1 to 6 carbon atoms and R' is alpha-amino-D-phenylmethyl.

5. A compound according to claim 4 wherein the compound is methyl 7-(alpha-amino-D-phenylglycylamido)-3-formyl-3-cephem-4-carboxylate.

6. A method for preparing 3-formylcephalosporin esters described in claim 1 which comprises (a) commingling a 7 acylamido - 3 - hydroxymethyl - 3 - cephem-4-carboxylic acid with a diazo compound of the formula:

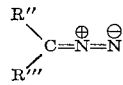

in which each of R″ and R‴ is selected from the group consisting of alkyl having from 1 to 6 carbon atoms, chloroalkyl having from 2 to 6 carbon atoms, benzyl, diphenylmethyl, and R″ and R‴ taken together with the carbon atom to which they are attached denote a monocyclic carbocyclic aryl hydrocarbon radical having from 6 to 8 carbon atoms, to obtain a 7-acylamido-3-hydroxymethyl-4-carboxylate ester, and (b) reacting said ester with an oxidizing agent selected from the group consisting of manganese dioxide and chromium trioxide to form as product a 7-acylamido-3-formyl-3-cephem-4-carboxylate ester.

7. A method as described in claim 6 wherein the 7-acylamido - 3 - hydroxymethyl - 3 - cephem-4-carboxylic acid used in step (a) is 7 - (2-thienylacetamido)-3-hydroxymethyl - 3 - cephem-4-carboxylic acid, and in the diazo compound each of R″ and R‴ is hydrogen, and in step (b) the oxidizing agent used is manganese dioxide.

8. A method as described in claim 7 wherein in step (b) the oxidizing agent used is chromium trioxide.

9. A method for preparing methyl 7 - (D-phenylglycylamido) - 3 - formyl - 3 - cephem-4-carboxylate which comprises reacting potassium 7 - [N-(tert-butyloxycarbonyl)amido - D - phenylglycylamido] - 3 - hydroxymethyl - 3 - cephem - 4 - carboxylate with diazomethane to form the methyl 7 - [N-(tert-butyloxycarbonyl)amido-D - phenylglycylamido] - 3 - hydroxymethyl - 3 - cephem-4-carboxylate ester, then reacting the methyl ester with manganese dioxide to form methyl 7 - [N-(tert-butoxycarbonyl)amido - D - phenylglycylamido] - 3 - formyl-3-cephem - 4 - carboxylate ester, and then reacting said 3-formyl methyl ester with formic acid to form methyl 7 - (D-phenylglycylamido) - 3 - formyl - 3 - cephem-4-carboxylate.

No references cited.

NICHOLAS S. RIZZO, *Primary Examiner.*